Patented Apr. 6, 1943

2,315,858

UNITED STATES PATENT OFFICE 2,315,858

FRUIT COMPOSITIONS AND METHOD OF PRESERVATION

William Redmond Johnston, Bronx, William E. Stokes, Brooklyn, Margaret H. Kennedy, New York, and Charles N. Frey, Scarsdale, N. Y., assignors to Standard Brands Incorporated, New York, N. Y., a corporation of Delaware No Drawing. Application December 30, 1937; Serial No. 182,494

9 Claims. (Cl. 99—154)

The invention relates to a method for the preservation of fruit juices, flavoring materials, essential oils, extracts, etc., and, more particularly, to a method for inhibiting oxygen deterioration of aromatic, flavoring and coloring principles of such compositions, and to a stabilized fruit composition produced thereby.

Essential oils, such as those of lemon, orange, lime, etc., upon exposure to air even for a short period of time and in the presence of oxygen taken up thereby subsequent to extraction from fruit even though sealed off shortly thereafter, undergo rapid change and soon acquire an undesirable odor and taste which makes the oil unsuitable for use in the manufacture of edible products. When fruit juices and other fruit compositions such as flavoring materials, extracts, etc., containing essential oils, undergo such change they develop a flat, stale taste and/or become bleached in color, and food products, such as gelatin desserts, prepared with use of fresh fruit compositions rapidly change and acquire disagreeable odors. In flavoring materials such as lemon or orange extract change in color due to oxidation is objectionable even though oxidative changes may not materially affect the flavor.

A general object of the present invention is the provision of an efficiently and readily practiced method for treating fruit juices, flavoring materials, essential oils, extracts, etc., whereby the foregoing difficulties are eliminated or reduced; and stabilized flavoring materials comprising or containing fruit compositions which are substantially free from such disadvantages.

A more specific object of the invention is to provide stabilized flavoring materials comprising or containing fruit compositions of which change in characteristic aroma, flavor and/or color due to exposure to air and contact with oxygen is effectively inhibited, and a method for their preparation involving the addition of an oxidation inhibitor.

Another object of the invention is the provision of a method for treating flavoring materials comprising or containing fruit compositions adapted for use as flavors containing flavor of natural origin by dispersion therein of an organic oxidation inhibitor belonging to the group consisting of hydroquinone, toluhydroquinone, catechol and resorcylaldehyde which prevents oxygen deterioration of aromatic, flavoring and coloring principles, does not materially or disagreeably affect the flavor and aroma thereof and causes them to retain their characteristic flavors, aromas and colors over an extended period of time; and to provide stabilized compositions resulting from the practice of the method.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the invention will be indicated in the claims.

In the practice of the invention fruit compositions, such as juices, flavoring materials, essential oils, extracts, etc., as soon after, or during, preparation or extraction from the fruit as is feasible are treated by dispersion therein of a relatively small amount of an organic oxidation inhibitor which prevents deterioration by oxygen of the delicate aromatic, flavoring and/or coloring principles thereof. The nature of the oxidation inhibitor and the amount used should be such as to avoid materially or disagreeably affecting the flavor and aroma.

Oxidation inhibitor substances which have been found to be effective are the dihydroxy benzenes hydroquinone, toluhydroquinone, catechol, and resorcylaldehyde. Hydroquinone has proven to be particularly effective alone and in combination with lecithin and triethanolamine. By the term "oxidation inhibitor" as used in the present application is meant any of such substances alone or in combination which give the desired results, and are distinguished from raw vegetable organic materials. The oxidation inhibitor may be added to the fruit composition in amounts varying from about 0.01 per cent to 0.6 per cent by weight of the composition.

As an illustrative embodiment of a manner in which the invention may be practiced the following examples are presented.

I. Hydroquinone was added to fresh oil of lemon, of orange and of lime in the proportion of about one part in 1000 and samples thereof were stoppered. Other samples of the oils without the inclusion of oxidation inhibitor were stoppered at the same time for use as controls. The samples were kept stoppered under normal room conditions for a period of twelve weeks and were examined every two weeks.

The controls lost most of their original color and developed a rancid odor within the first two weeks. The other samples showed no change except a very slight loss of the delicate top odor when compared with fresh oils. After the first two weeks the poor keeping qualities of the controls became more and more pronounced, while the treated samples showed practically no change until the eighth week when slight loss in color and development of a slight off odor was noted in the orange and lime samples. At the end of twelve weeks the treated samples still showed little change, remaining good in flavor, aroma and color and suitable for use. No foreign flavor attributable to the hydroquinone was noticeable.

II. Similar procedure was followed with like oils and a combination of hydroquinone and lecithin in the proportion of about one part in 2000 of each of the oxidation inhibitor substances. Similar results were obtained. The treated samples remained good in flavor, aroma and color and suitable for use, but were slightly less desirable than the samples treated with hydroquinone alone. No foreign flavor attributable to the oxidation inhibitor was in evidence.

III. The procedure of II above was repeated with a substitution of triethanolamine for lecithin and like results obtained.

IV. Catechol was added to strawberry oil in the proportion of about one part in 2000 and the procedure outlined in I above repeated. The oil was stabilized as well as were the oils treated in procedures II and III above and no foreign taste attributable to the catechol was noted.

V. One part resorcylaldehyde in 200 was substituted for the catechol and the procedure of IV above repeated. Very similar results were obtained.

VI Gelatin desserts may be prepared with the use of the flavoring material of the Stokes et al. Patent 2,088,622 of August 3, 1937. Such material may include gelatin, a flavor as an oil, ethyl succinate and hydroquinone. By way of example, gelatin may be dissolved in water and ethyl succinate, hydroquinone, and flavoring oil, such as orange oil, lemon oil or lime oil, added thereto. In the case of orange oil about 0.03 gram hydroquinone may be effectively utilized with about 21 grams of the oil. For the lemon flavor about 0.019 gram hydroquinone may be effectively utilized with about 16 grams of the oil. When using lime oil about 0.012 gram of hydroquinone may be employed with about 10 grams of the oil. The resultant mixtures may then be dried and ground and used as flavoring materials for dessert gelatin. Such flavoring materials containing an oxidation inhibitor and flavor volatility reducent, have been found to have surprisingly good keeping qualities and gelatin desserts prepared with the use thereof after being permitted to have an opportunity to deteriorate were found to retain the strength and delicacy of flavor and aroma of the fresh flavors.

It will thus be seen that the objects set forth above are efficiently attained and since certain changes in carrying out the above method, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

Having described our invention, what we claim as new and desire to secure by Letters Patent, is:

1. The method for the preservation of aromatic, flavoring and coloring principles of fruit juices, fruit flavoring materials, essential oils of fruits and fruit extracts, which comprises adding thereto hydroquinone, whereby oxygen deterioration of such principles is prevented without materially affecting the flavor and aroma.

2. The method for the preservation of aromatic, flavoring and coloring principles of fruit juices, fruit flavoring materials, essential oils of fruits and fruit extracts, which comprises adding thereto an amount between about 0.01 per cent to 0.6 per cent by weight of hydroquinone.

3. A stabilized flavoring material containing an aromatic, flavoring and coloring principle of natural fruit origin, and an amount between about 0.01 per cent to 0.6 per cent by weight of hydroquinone as an oxidation inhibitor.

4. The method for the preservation of fruit compositions containing aromatic, flavoring and coloring principles of natural fruit origin, which comprises adding hydroquinone thereto.

5. A stabilized fruit composition comprising a material selected from the group consisting of fruit juices, fruit flavoring materials, essential oils of fruits and fruit extracts, and hydroquinone as an oxidation inhibitor.

6. A stabilized flavoring material containing an aromatic, flavoring and coloring principle of natural fruit origin, and hydroquinone as an oxidation inhibitor.

7. The method for the preservation of aromatic, flavoring and coloring principles of fruit juices, fruit flavoring materials, essential oils of fruits and fruit extracts, which comprises adding thereto as an organic oxidation inhibitor a chemical compound belonging to the group consisting of hydroquinone, toluhydroquinone, catechol and resorcylaldehyde, whereby oxygen deterioration of such principles is prevented without materialy affecting the flavor and aroma.

8. A stabilized fruit composition comprising a material selected from the group consisting of fruit juices, fruit flavoring materials, essential oils of fruits and fruit extracts, and an organic oxidation inhibitor of the chemical compound type belonging to the group consisting of hydroquinone, toluhydroquinone, catechol and resorcylaldehyde.

9. A stabilized flavoring material containing an aromatic, flavoring and coloring principle of natural fruit origin, and an organic oxidation inhibitor of the chemical compound type belonging to the group consisting of hydroquinone, toluhydroquinone, catechol and resorcylaldehyde.

WILLIAM REDMOND JOHNSTON.
WILLIAM E. STOKES.
MARGARET H. KENNEDY.
CHARLES N. FREY.